Jan. 7, 1958
J. P. SAPP
2,818,907
TIRE BUILDING MACHINERY
Filed May 26, 1955
9 Sheets—Sheet 1
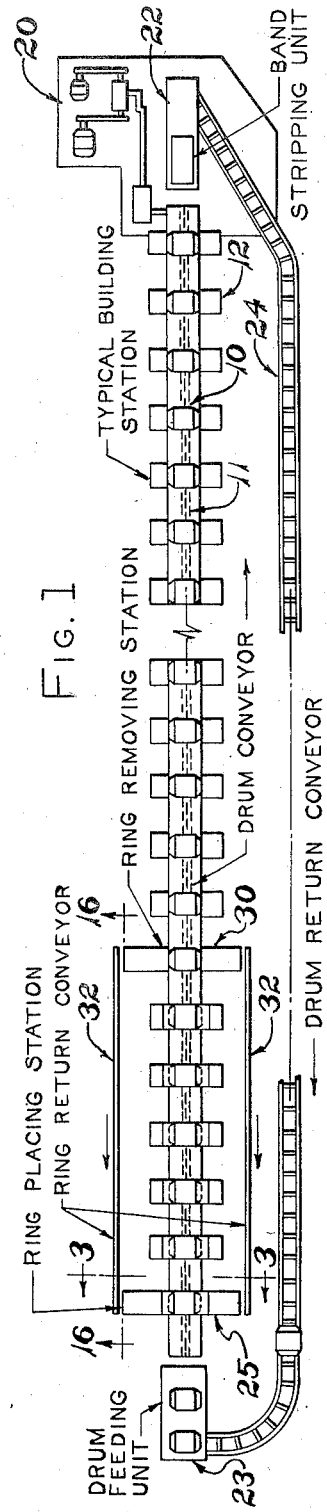
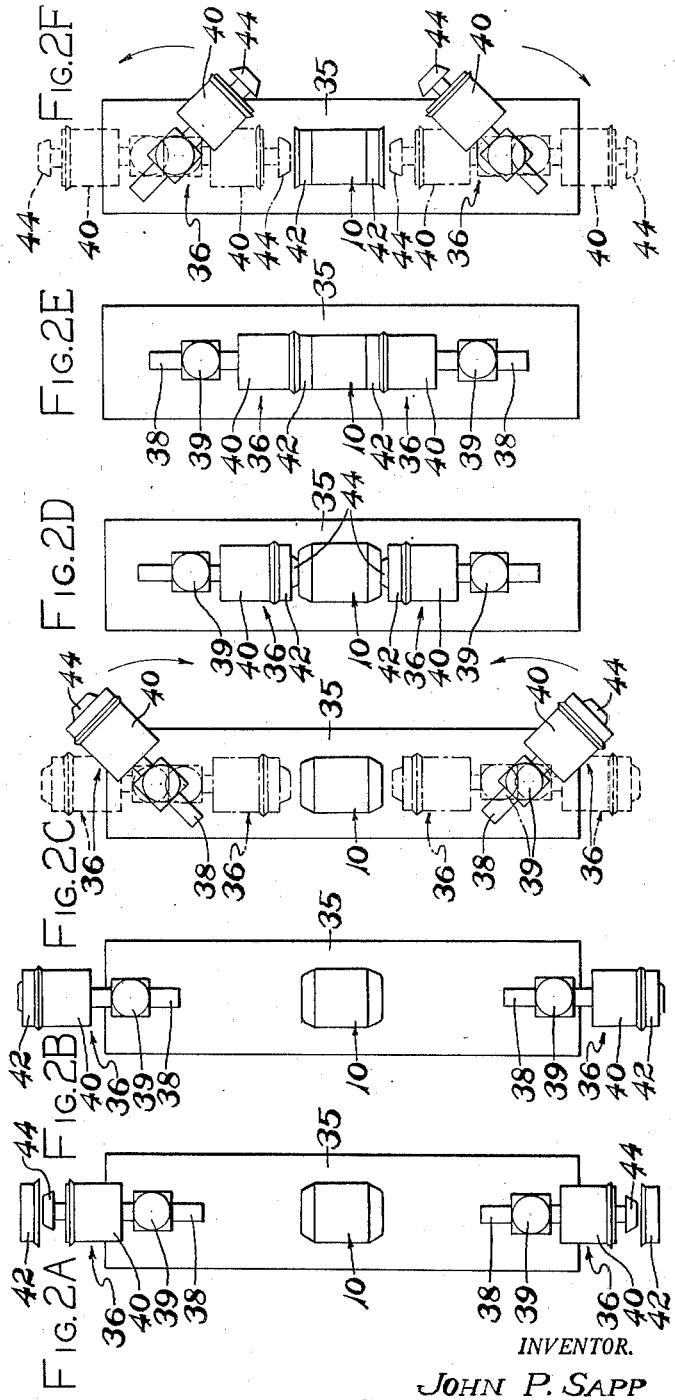
INVENTOR.
JOHN P. SAPP
BY
J O Haney
ATTY.

Jan. 7, 1958        J. P. SAPP        2,818,907
TIRE BUILDING MACHINERY
Filed May 26, 1955        9 Sheets-Sheet 2
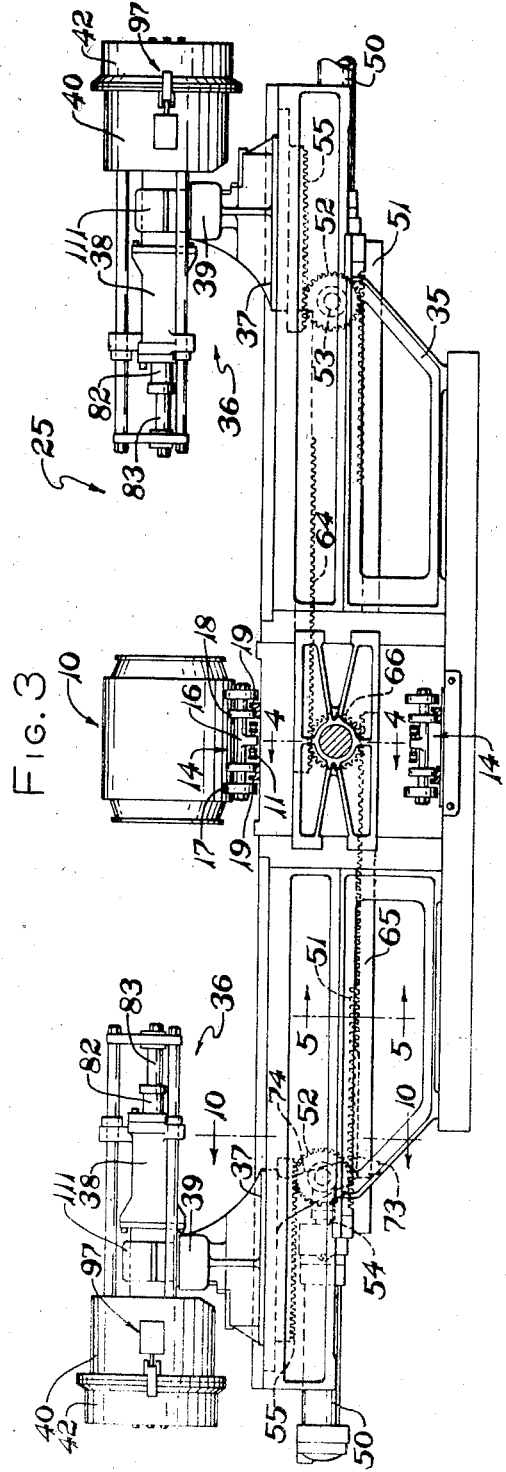
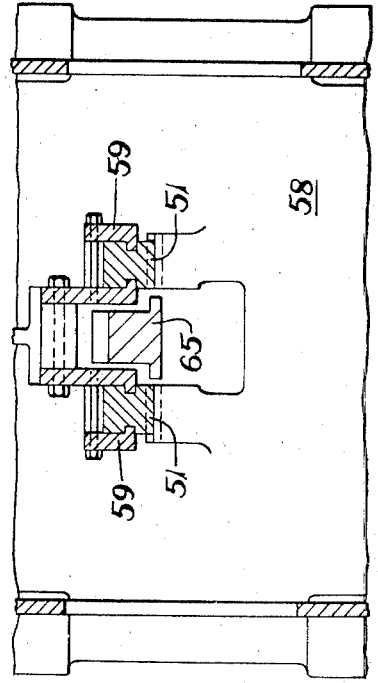
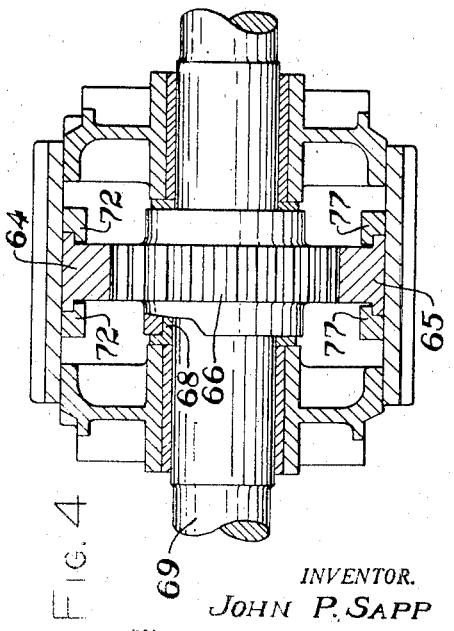
INVENTOR.
JOHN P. SAPP
BY
ATTY.

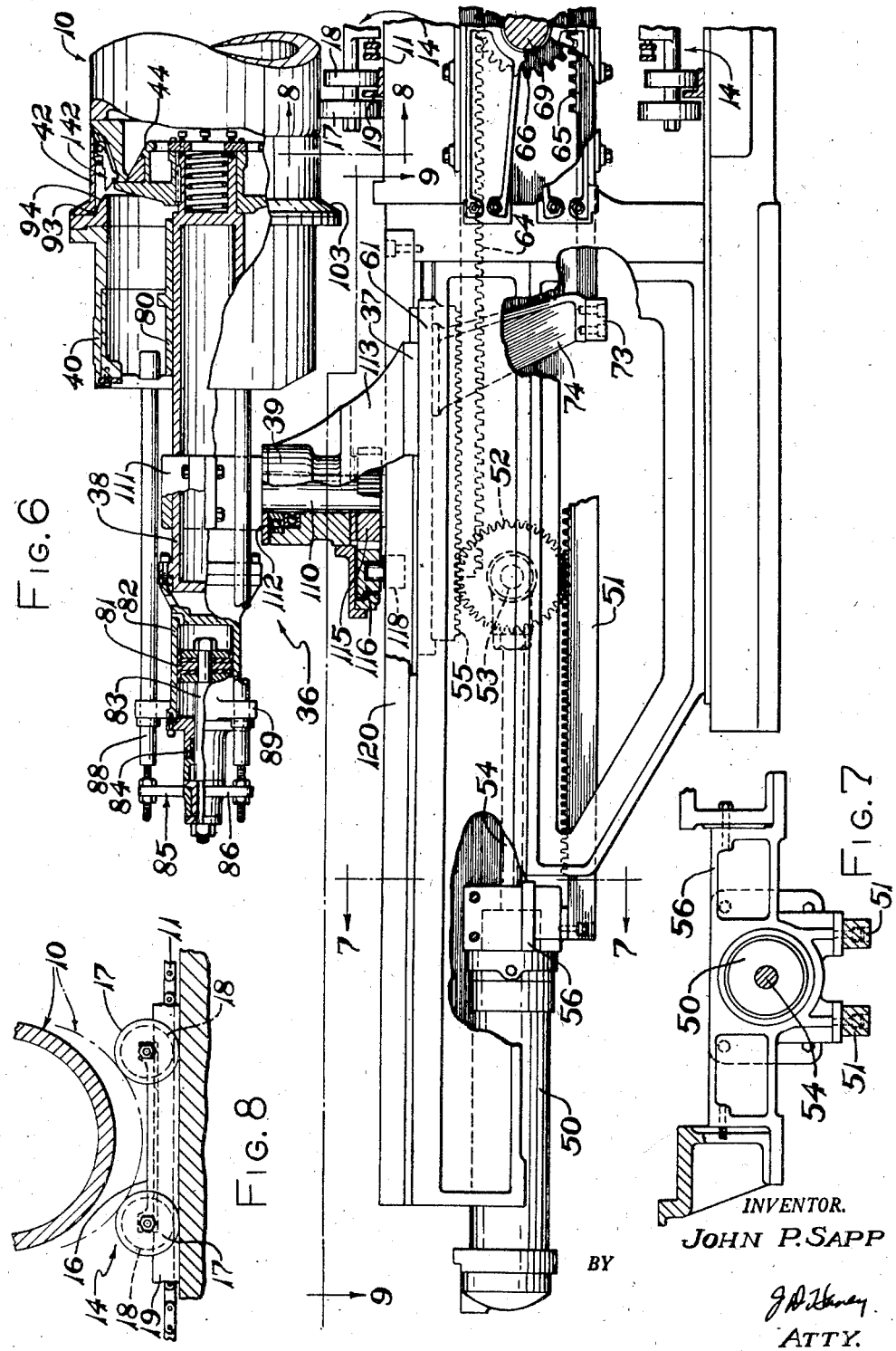

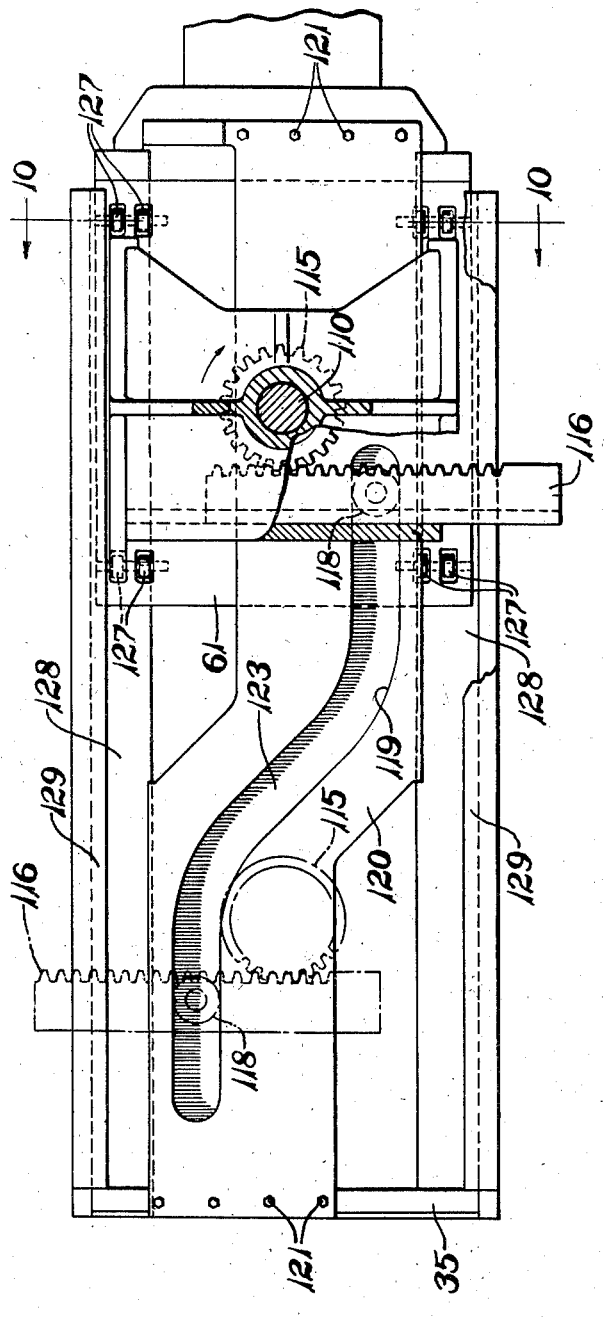

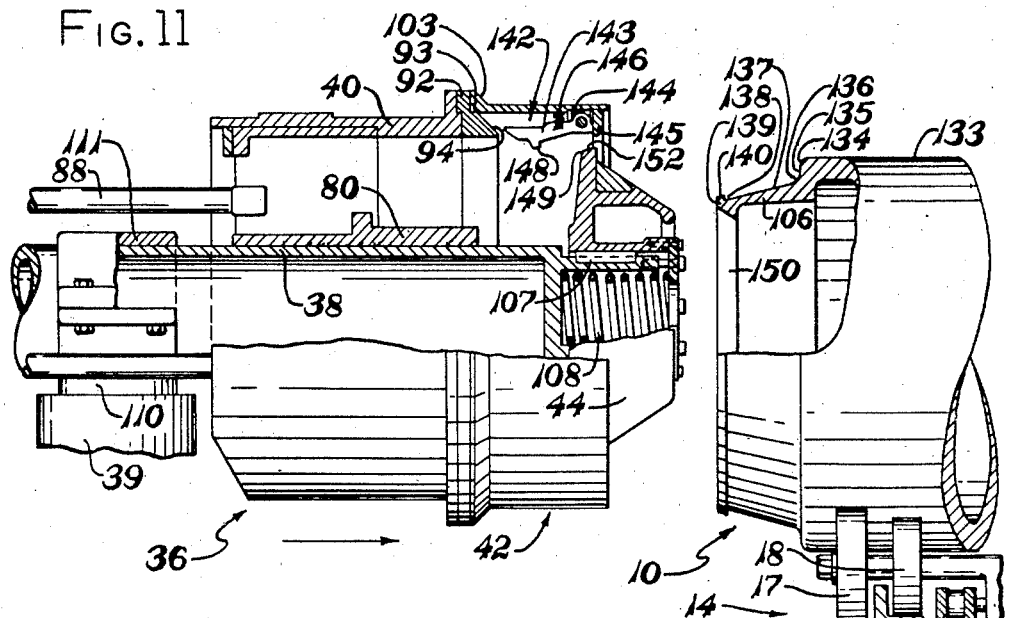
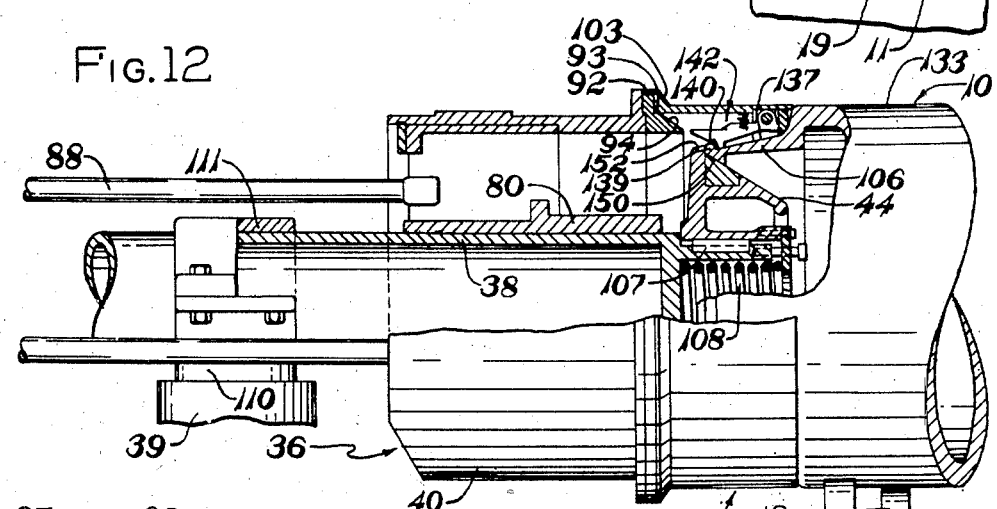
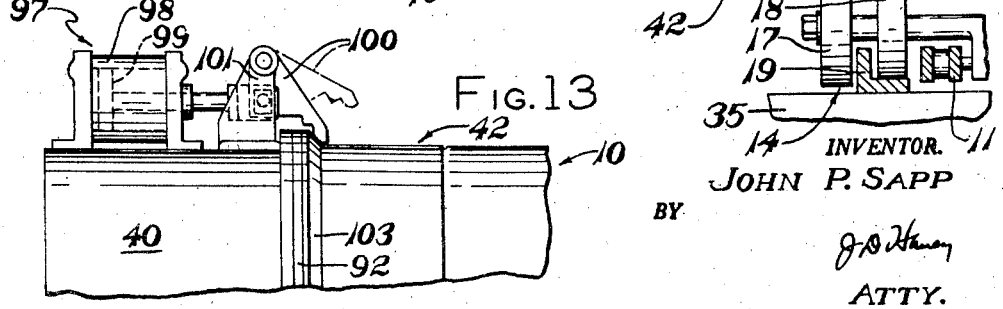

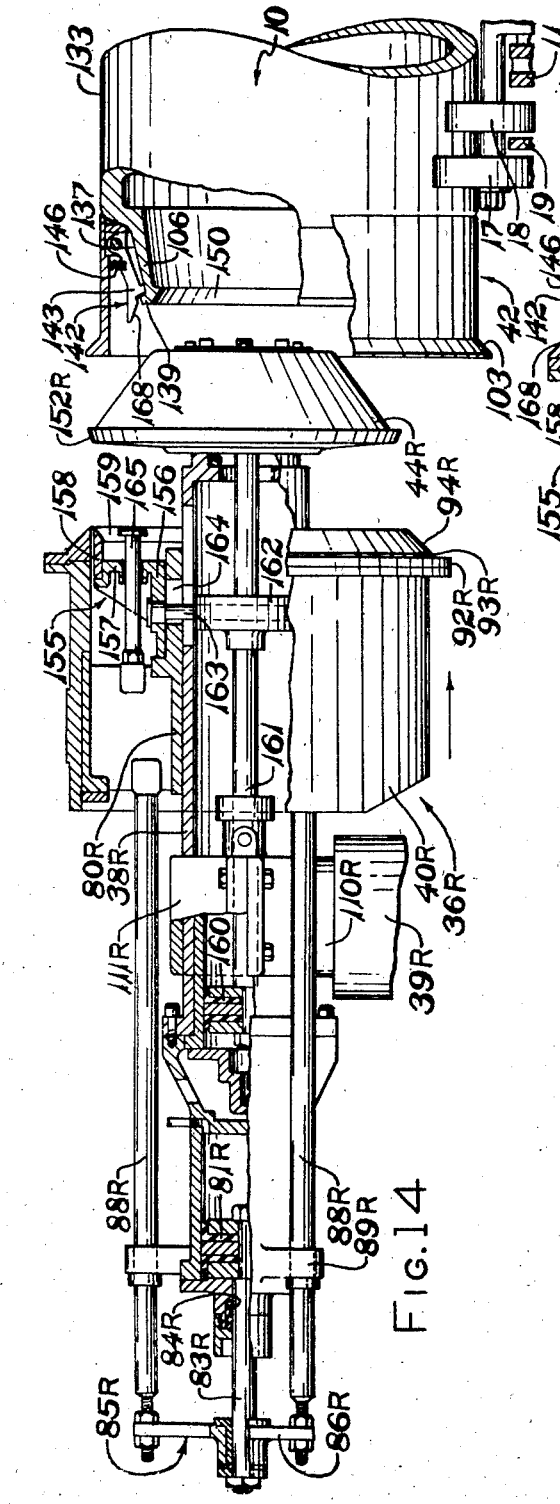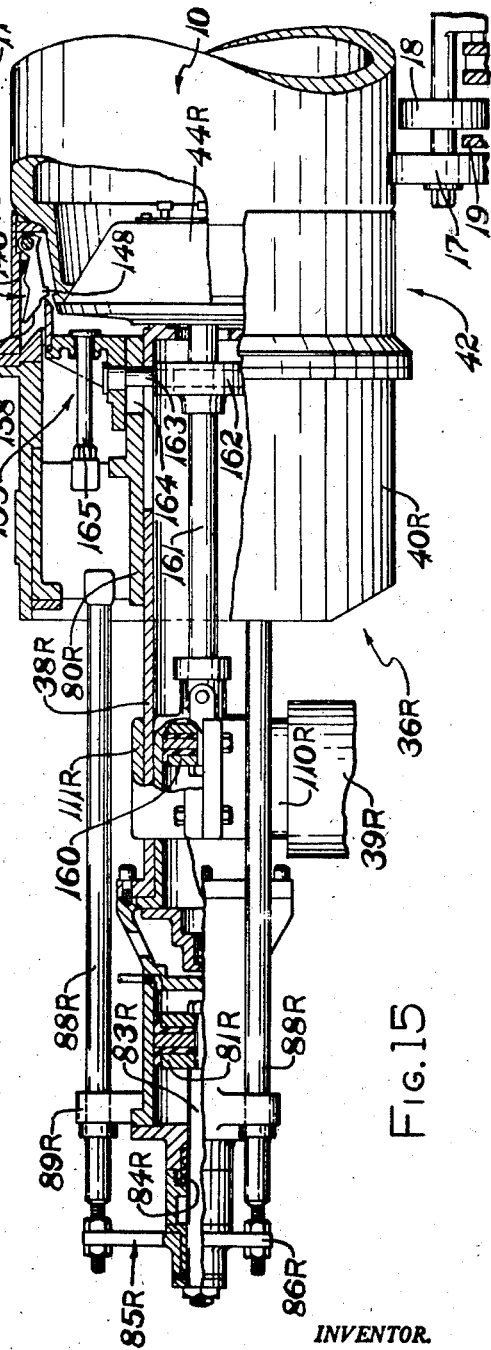

Jan. 7, 1958 J. P. SAPP 2,818,907
TIRE BUILDING MACHINERY
Filed May 26, 1955 9 Sheets-Sheet 8
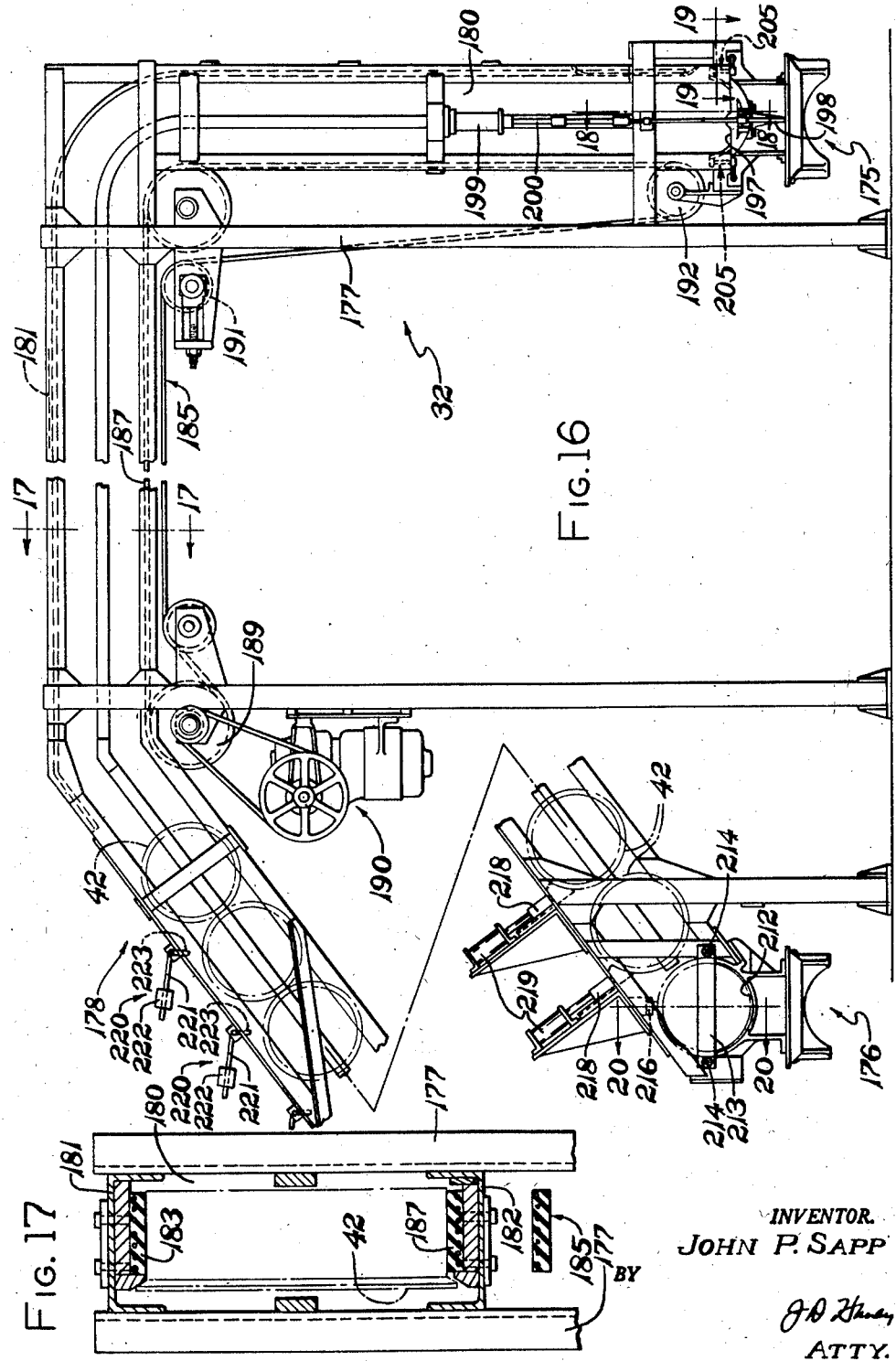
INVENTOR.
JOHN P. SAPP
BY
ATTY.

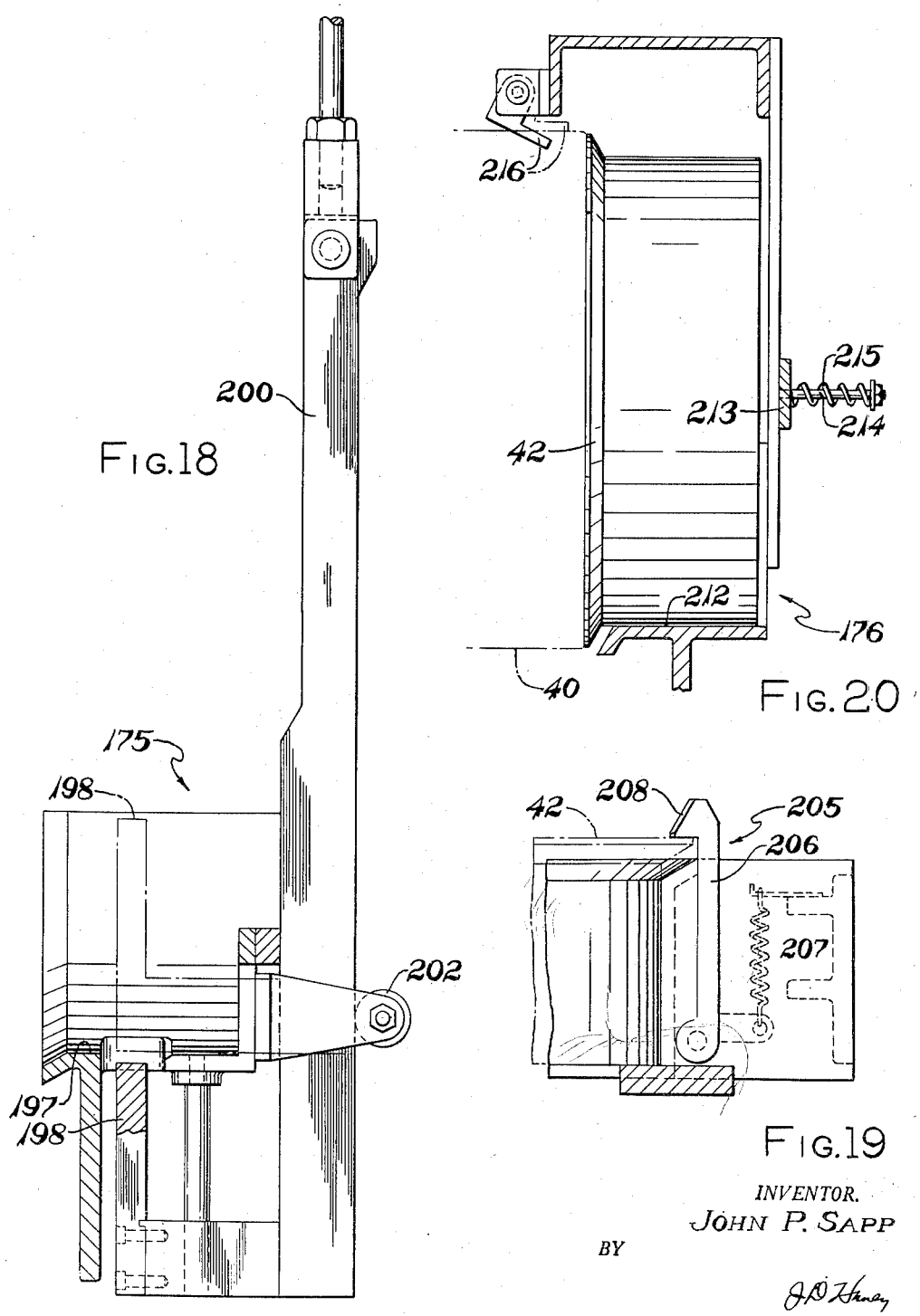

United States Patent Office 2,818,907
Patented Jan. 7, 1958

2,818,907

TIRE BUILDING MACHINERY

John P. Sapp, Kent, Ohio, assignor to The B. F. Goodrich Company, New York, N. Y., a corporation of New York Application May 26, 1955, Serial No. 511,203

30 Claims. (Cl. 154—9)

This invention relates to the manufacture of pneumatic tires and more particularly to equipment for building tire carcasses in the form of generally cylindrical bands prior to the operation of shaping and vulcanizing the carcasses.

In the manufacture of tubeless tires, it is generally desirable to form the diffusion-resistant interior rubber liner so that its margins embrace the toes of the beads and extend substantially to or even around the heels of the beads and to form the under bead plies so that their margins will embrace the beads and extend an appreciable distance into the sidewall of the tire. Accordingly, the under bead plies are very much wider than the peripheral face of the tire building and in the initial stages of the building operation they are centered on the drum with their margins overhanging the ends or shoulders of the drum a substantial distance. The diffusion-resistant liner material is also somewhat wider than the peripheral face of the drum and its margins overhang the drum shoulders. To support these overhanging margins prior to setting the beads in the carcass, it has been proposed to extend the width of the peripheral face of the building drum by means of cylindrical members, usually called extension rings, which fit coaxially to the ends of the building drum. These rings make it possible to accurately locate the under bead plies on the diffusion-resistant liner sheet and to avoid wrinkling these elements as they are applied and to secure proper adhesion among these elements. The rings are usually removed from the drum immediately prior to the operation of setting the beads.

According to the present invention, tire building equipment is provided in which such drum extension rings are automatically engaged and then disengaged from a building drum at the appropriate times in the tire building procedure. The invention includes a novel construction for the extension rings, per se, which facilitates the engagement and disengagement of the rings with a tire building drum; novel apparatus for placing and for removing the rings and novel apparatus for handling the rings between the time they are removed from the drum until they are reengaged with the drum. The ring-placing and ring-removing apparatus each include a turret structure which may also be usefully employed if desired in other tire building operations for positioning annular members such as a bead core coaxially against the end of a tire building drum. The form of the invention illustrated in the drawings is in connection with a tire building machine of the type in which building drums are moved sequentially through a series of building stations at each of which a drum is chucked and some step of the tire building procedure is performed. A machine of this type is described and claimed in United States Patent No. 2,319,643, issued to Frank S. Sternad and John P. Sapp.

The invention will be further described with reference to the accompanying drawing in which:

Fig. 1 is a schematic diagram of a complete tire building machine embodying the ring-handling equipment of this invention;

Figures 2A to 2F are diagrammatic views showing the successive stages in the cycle of operation of the ring removing turrets and illustrate the principal elements and the mode of operation of the elements of the ring-placing equipment and the ring-removing equipment;

Fig. 3 is a side elevation taken transversely to the tire building machine along the line 3—3 of Fig. 1 showing the structure of the ring-placing unit;

Figure 10:
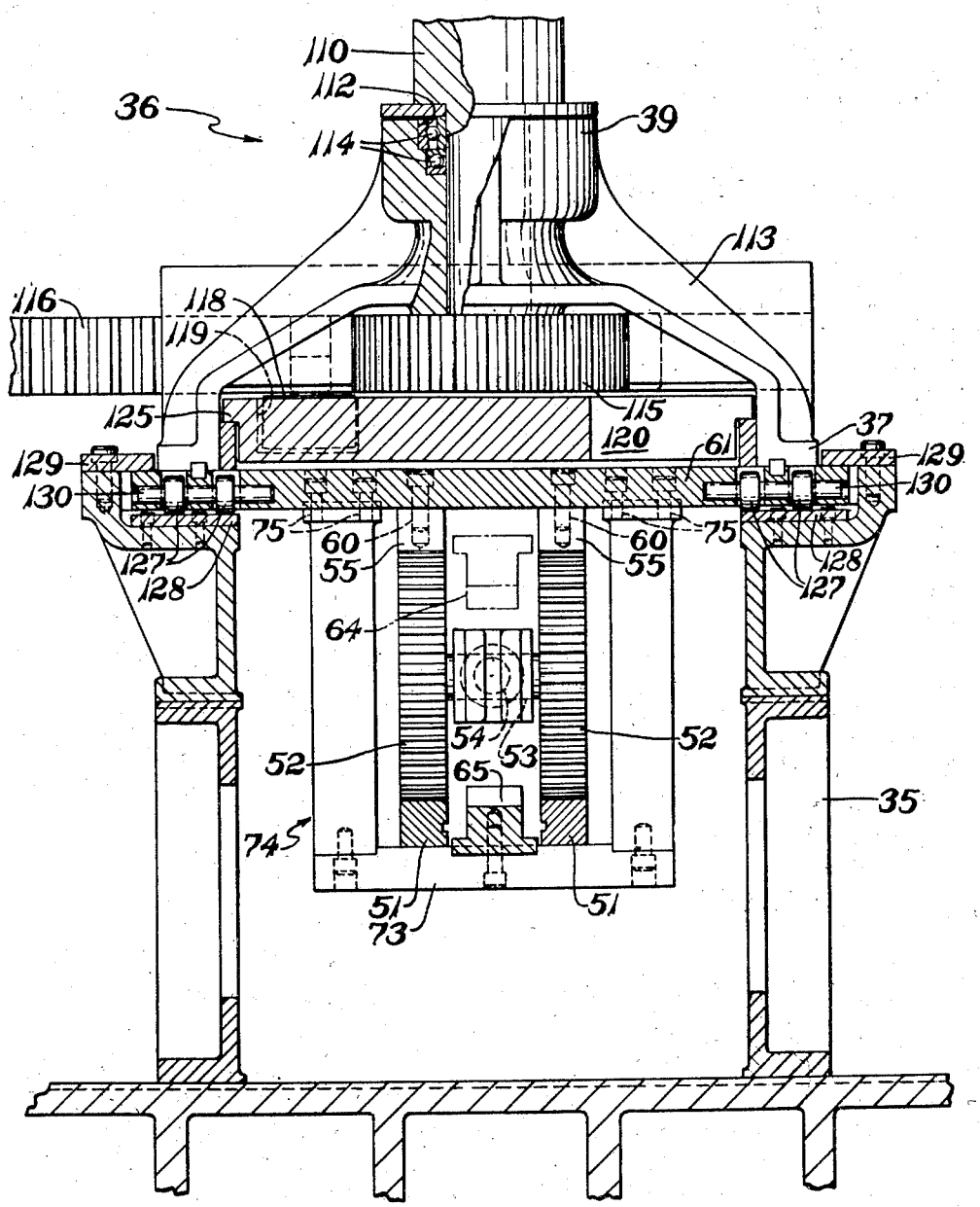

Figs. 4 and 5 are detailed views taken along the lines 4—4 and 5—5, respectively, of Fig. 3;

Fig. 6 is an enlarged side elevation of one of the turrets of the ring-placing unit with portions broken away to illustrate the structure;

Figs. 7 and 8 are fragmentary detailed views taken along the lines 7—7 and 8—8, respectively, of Fig. 6;

Fig. 9 is a plan view of the cam for swiveling the turret during translational motion thereof, the view being taken on the lines 9—9 of Fig. 6;

Fig. 10 is a sectional, elevational view taken on the lines 10—10 of Fig. 9;

Figs. 11 and 12 are enlarged fragmentary sections of the turret heads of the ring-placing mechanism illustrating the engagement of a ring with the building drum;

Fig. 13 is a fragmentary view showing the latch mechanism for securing the rings to the turret heads;

Figs. 14 and 15 are views showing the turret heads of the ring-removing units in the operation of removing a ring from the drum;

Fig. 16 is a side elevation of the ring-return conveyor taken along the lines 16—16 of Fig. 1; and Figs. 17, 18, 19 and 20 are fragmentary detail views taken along the corresponding section lines in Fig. 16.

*General arrangement*

The schematic plan view of Fig. 1 shows the manner in which the equipment of this invention is employed in connection with the complete tire building machine of the type shown in Patent 2,319,643. In this type tire building machine a series of collapsible tire building drums 10 are carried by a conveyor 11 through each of a series of successive building stations 12. At each station the drum then at that station is chucked and rotated, if necessary, and some portion of the tire building procedure is performed. Upon the completion of the particular building operation at each station the drum is unchucked and returned to the conveyor and then all of the drums are advanced to the next succeeding station. The conveyor is a chain-type conveyor with cradles 14 (see Fig. 8) secured at intervals along its length to support the drums. The cradles include a rectangular frame 16 with four rollers 17 at the corners of the frame which receive the peripheral face of the building drum, and rollers 18 (see Fig. 3) which ride along horizontal rails 19 extending between adjacent stations.

The drum conveyor is driven intermittently by a power unit 20 at the right end of Fig. 1 to bring each of the drums in succession to each of the building stations. Depending on the type of tire under construction, some of the stations may not actually be used. A typical type of building station for this type machine is shown in United States Patent 2,319,643 and also in United States Patent 2,496,137. When a drum has passed the last building station, a complete tire carcass has been built upon it and it is delivered by the conveyor to a stripping unit 22 where the carcass is removed from the drum and the drum is returned to a loading unit 23 at the left in Fig. 1 along the drum return conveyor 24. A preferred band stripping unit is disclosed in United States Patent 2,479,027. A preferred drum loading unit is explained in United States Patent 2,487,196.

The equipment provided by this invention includes a ring-placing unit 25 located in Fig. 1 at the first tire building station for engaging extension rings to each drum as they are delivered to the conveyor; a ring-removing unit 30 which in Fig. 1 is located at the seventh building station for disengaging the rings as each drum is advanced beyond this station; and ring-returning conveyors 32 connecting the ring-removing unit 30 with the ring-placing unit 25.

The structure of the ring-placing unit 25 is identical with that of the ring-removing unit 30 except that the ring-removing unit includes an additional mechanism for unlatching the rings which is explained in connection with Figs. 14 and 15.

Mode of operation of the ring-placing unit 25

Referring to Fig. 3 the principal elements of the ring-placing unit 25 are a base frame 35 and a pair of turrets 36 mounted slidably on the base frame on opposite sides of the drum conveyor 11 at the center of the base frame 35. Each of the turrets 36 is movable translationally toward and away from the drum conveyor 11 along its respective side of the base frame 35. Each turret 36 includes a turret base 37 which is slidably engaged with base frame 35 and to which a body portion 38 is swivelly connected by a swivel bearing 39. The body portion 38 of each turret supports a turret head 40 for axial movement relative to the body portion 38 and the bearing 39.

In Fig. 3 the turrets 36 are shown in a position in which their respective turret heads 40 are turned outwardly from a building drum 10 on conveyor 11. The heads 40 are also shown retracted close to the swivel bearing 39. Also, in Fig. 3, each turret head 40 has engaged with it an extension ring 42.

Preferably the "neutral" position of the turrets 36 of the ring placing unit 25 is a position in which the turret heads 40 are directed inwardly toward but spaced from the conveyor 11, and with the turret heads 40 each supporting an extension ring 42. The rings 42 are thus poised for placement against a building drum 10 as soon as the drum is delivered to the center of base frame 35 by the conveyor 11. When a drum 10 is positioned by the conveyor 11, both turrets 36 operate in unison to (a) chuck the drum set the rings 42 in engagement with the ends of the drum; (b) back away from the drum to unchuck the drum, leaving the rings 42 latched to the drum; (c) swivel outwardly away from the drum to their reversed position (as in Fig. 3); (d) move translationally to their respective ring return conveyors 32 to pick up another pair of extension rings 42; and then (e) swivel reversely to their original position with the new pair of rings 42 to await the arrival of the next drum.

The precise movements of the turrets 36 of the ring-placing unit 25 in transferring a pair of rings 42 to the ends of a drum 10 are shown in the series of diagrammatic Figures 2A–2F. Fig. 2A shows the turrets 36 moving axially away from the drum and with their respective turret heads 40 directed outwardly toward extension rings 42 which are to be picked up by the turrets. During this movement each turret head 40 is retracted close to its respective swivel bearing 39.

When each turret 36 reaches the outermost limit of its translational movement, which is the position of the turrets 36 represented in Fig. 2B, its turret head 40 is aligned coaxially with but spaced slightly from the extension ring 42 which it is to receive. The extension ring 42 is picked up by the turret head 40 by projecting the turret head 40 axially forward relative to its swivel bearing 39 against the edge of the ring. Upon engaging the ring, mechanism hereinafter described is then actuated to fasten the ring 42 to turret head 40. Then the turret head 40 is retracted toward its respective swivel bearing 39 to remove the extension ring 42 from its ring conveyor 32. Simultaneously with the retraction of the head 40, each turret 36 is moved translationally along the base frame 35 toward the center portion of the base frame. In the course of this translational movement, the body portion 38 and turret head 40 of each turret is swivelled on its bearing 39 until the turret head 40 and the ring 42 carried thereon is directed inwardly as shown in Fig. 2C.

Normally the movement of the turrets is arrested when they have reached the inwardly turned dotted position of Fig. 2C until a drum 10 is brought between the turrets by conveyor 11. After the drum 10 is positioned between the turrets, the turrets 36 are again moved toward the drum to move the rings 42 simultaneously toward opposite ends of the drum.

During the swiveling movement of each turret 36, its turret head 40 is retracted close to the swivel bearing 39 so that a conical chuck 44 disposed within the turret head and mounted on the body (see Fig. 6) projects axially through the extension ring 42 then engaged with the turret head 40. Hence, as the turrets advance axially toward the drum the cone chucks 44 engage the ends of the drum ahead of the extension rings as is shown in diagram 2D. These cones raise the drum from its cradle 14 as the axial movement of the turrets continues until the drum is centered coaxially with the rings. The inward translational movement of the turrets 36 ceases when the cone chucks 44 are fully engaged with the drum and at about this instant each turret head 40 is extended away from its respective swivel bearing 39 to urge the rings against the ends of the drum as shown in Fig. 2E. Appropriate mechanism hereinafter described is provided to unlatch the rings from the turret heads and to latch the rings to the ends of the drums.

As soon as the rings are engaged with the drum, the turret heads 40 are retracted toward the swivel bearing 39 so that the heads are separated from the rings. The turrets 36 are then moved translationally away from the drum thereby disengaging the cone chucks 44 which results in lowering the drum back to its cradle on the chain conveyor, the extension rings remaining secured to the ends of the drum. After the turrets have been backed sufficiently away from the drums that the cones 44 are clear of the rings, the turret heads 40 are swivelled on their bearings 39 in a direction reverse to their former path as shown in Fig. 2F to turn the turret heads to an outwardly directed position. The outward translational movement of the turrets then continues as shown in Fig. 2A and each proceeds toward its respective ring return conveyor 32 to pick up another ring 42.

Mode of operation of the ring-removing unit 30

The cycle of movement of the turrets 36 of the ring-removing unit 30 to disengage the rings is essentially the same as that of the turrets of the unit 25 and the unit 30 operates synchronously with unit 25 but that the respective cycles of these units are not in phase with each other. That is, the cycle of the ring-placing unit 25 starts with the turrets in the inwardly-turned position of Fig. 2C from which they are moved in against the drum to chuck it and set the rings, while the corresponding turrets 36 of the ring-removal unit 30 at this same instant are moved inwardly from the inwardly-turned dotted position of Fig. 2F to chuck their respective drum and to disengage the rings.

The successive stages in the cycle of operation of the ring-removing turrets 36 may be seen in the diagram of Fig. 2 by following the diagrams starting with Fig. 2F and reading toward Fig. 2A.

Upon arrival of a building drum at the ring-removing unit 30 the turrets of the ring-removing unit will be positioned in inwardly-turned dotted position shown in Fig. 2F with the turret heads retracted. The drum upon arrival will have several plies wrapped about its exterior and possibly other elements of the tire construction so that the plies will be of sufficient length to overhang the ends of the drum and these overhanging margins will be supported by extension rings. The first movement of the turrets 36 of the ring-removal unit 30 is to be advanced axially toward the drum. The cone chucks 44 of the removal turrets 36 project through the extension rings and engage the ends of the building drum to raise the drum from the conveyor and chuck it in coaxial alignment with the turret heads. The turret heads 40 then are extended to engage the rings 42 as shown in Fig. 2E and appropriate mechanism subsequently described is provided within the turret heads to unlatch the rings from the drum. The turret heads with the rings secured thereto are then retracted toward their respective swivel bearings 39 to displace the rings from the drums. Simultaneously the turrets are backed away from the drum, unchucking the drum and lowering the drum to its cradle 14 of the drum conveyor 11.

In the course of the movement of the turrets away from the drum, the turrets are swiveled 180° as shown in Fig. 2C until the turret heads are directed outwardly. Upon further translational movement of the turrets, the turret heads are brought to a position adjacent the loading end of the ring-return conveyors 32 hereinafter described and the extension rings are delivered to the ring return conveyors as shown in Fig. 2B. Then the turrets are backed away from the ring conveyor as shown in Fig. 2A and are returned with a reverse swiveling motion to the inwardly-directed position shown in the dotted lines in Fig. 2F to await the arrival of the next tire building drum.

The translational movements of each of the turrets 36 of the ring-placing units 25 axially of the drum are powered by a cylinder 50 (see Figs. 3, 6 and 10) which operates a gear-and-rack differential formed by a pair of stationary rack members 51 secured to the base framework 35, a pair of gears 52 rotatably mounted on a stub shaft 53 at the extremity of the piston rod 54 of the cylinder 50 and which are meshed with the stationary racks 51, and a pair of racks 55 secured to the bottom of the turret base 37 which are in mesh with the upper side of the gears 52. Each cylinder 50 is supported horizontally by a bracket 56 secured to the base framework. The stationary rack members 51 of the differential are secured rigidly to bracket 56 by cap screws 57 and extend forwardly therefrom toward the center of the base 35 and the opposite ends of these racks are fastened to a bulkhead 58 near the center of the base (see Fig. 5) by a fixture 59. The upper racks 55 of the differential are secured by cap screws 60 (see Fig. 10) to a plate 61 which is slidable on the base frame 35 and which forms a portion of the turret base 37. Hence, the reciprocating motion of piston rod 54 is transmitted to the turret base 37 to move the turrets translationally a distance of twice the length of the stroke of the piston rod 54.

To synchronize the movements of the pair of turrets 36 the turrets 36 are interconnected as shown in Fig. 3 by horizontal racks 64 and 65 which are mutually in mesh with an idler pinion 66 at the center of the base frame 35 immediately below the building drum. The idler pinion 66 (see Fig. 4) is rotatable on a bushing 68 about the portion of the main drive shaft 69 of the tire building machine which extends through the base frame 35 of the ring-placing unit. Although this shaft 69 extends through the base frame 35 of both the ring-placing unit 25 and the ring-removing unit 30 it has nothing to do with the operation of either of these units and is merely journaled in brackets 70 adjacent the idler gear. The function of this shaft is to operate chucking mechanisms of other building stations in the machine.

In Fig. 3 the right turret 36 has its synchronizing rack 64 secured directly to the center of the lower plate 61 of the turret base 37 and extends horizontally over the idler pinion 66 at the center of the machine. Rack 64 is generally T-shaped in cross-section and is held in mesh with the idler by a fixture 72 shown in Fig. 4. The synchronizing rack 65 of the left turret is secured to the bottom rail 73 of a bracket 74 (see Fig. 10 and also Fig. 6) which depends from the lower plate 61 of the left turret. This bracket 74 is a generally U-shaped rigid hanger, the open end of which is fastened to the lower plate 61 of the turret base by cap screws 75 and is sufficiently large to slidably embrace the differential rack mechanism 51, 52, 55 which extends through this hanger in certain positions of the turret. The synchronizing rack 65 extends forwardly from the hanger bracket through the bulkhead 58 (see Fig. 5) to mesh with the lower side of the idler pinion 66. It is slidably guided and also retained in mesh with the idler pinion 66 by a fixture 77 shown in Fig. 4.

When the right turret 36 as shown in Fig. 3 is in a position close to the drum 10 its synchronizing rack 64 will extend a substantial distance under the left turret as shown in Fig. 6, for example. Hence this rack 64 in this position of the turret will project through the hanger bracket 74 and in the view in Fig. 10 this rack 64 is accordingly indicated by chain dotted lines. It should be understood that the lower rail 73 of the bracket slides along the bottom of the stationary differential racks 51 shown in Fig. 10 during the translational movements of the left turret.

The structural details of the turrets of the ring-removing unit 30 are identical in the foregoing respects with the turrets of the ring-placing units 25.

*Details of the turret structure 36*

The details of the turrets are best shown in Figs. 6, 9 and 10. Referring to Fig. 6, the turret head 40 of each turret is a hollow generally cylindrical shell and is mounted slidably on the body portion 38 by an interior sleeve 80 which is integral with the turret head. The head 40 is shifted axially along the body by a double acting piston 81 mounted in a cylindrical casing 82 on the rear of the body, the piston operating a piston rod 83 which extends through a packing 84 to a spider 85 at the rear of the body having 120° spaced legs 86. The legs 86 are secured to push rods 88 which extend forwardly to and are engaged with the turret heads. The push rods 88 are slidably supported in a guide spider 89 secured to the piston casing 82. The piston 81 is therefore operable to extend or retract the head 40 along the body relative to the swivel bearing 39. Fig. 11 shows the position of a turret head 40 of the ring-placing unit in retracted position and Fig. 12 shows the corresponding position of a turret head in its extended position.

The forward edge of the turret head 40 has attached to it an annulus 92 to engage an extension ring 42. This annulus 92 includes a cylindrical ledge 93 to engage the lip of the extension ring and a bevel face 94 leading inwardly from the ledge 93 to center a ring 42 relative to the turret head when the turret head picks up the ring.

An extension ring 42 is locked to the annulus 92 during the period it is carried by the turret head 40 by a lock mechanism 97 on the outside of each turret head as shown in Fig. 3 and which mechanism is shown in detail in Fig. 13. Preferably there are at least two lock mechanisms 97 on each turret head, the mechanisms being located on diametrically opposite sides of the head. This mechanism includes a pressure cylinder 98 mounted to the exterior of the turret head and having a piston 99 connected to a lever 100 pivotally supported between a clevis 101 also mounted on the outside of the turret head close to the annulus 92. When an extension ring 42 is engaged with the annulus the cylinder 98 maintains the lever 100 in the position shown in the solid lines in Fig. 13, where it is in pressure contact with an exterior beveled edge 103 of the extension ring 42. After the turret head has set the ring against a drum, cylinder 98 is operated to swing the lever 100 into the dotted position of Fig. 13, where it is clear of the beveled edge 103 of the extension ring.

The chucking cones 44 (see Figs. 6, 11, 12) of each turret are castings mounted to the forward end of the body 38 and have a generally truncated conical face directed coaxially of the drum to engage shoulders 106 of the drum. Preferably in both the ring-placing unit 25 and the ring-removing unit 30 one of the turrets of each of these units has its chucking cone 44 secured rigidly (not shown) to the body 38 whereas the other turret of each unit has its chucking cone 44 mounted for limited axial sliding movements relative to its respective body 38. The latter construction is illustrated in Figs. 6, 11 and 12, in which the cone 44 is slidable axially of body 38 on a feather key 107 at the front end of the body, and is normally biased toward the building drum by a spring 108. The spring 108 and feather key 107 provide a snug engagement of the cones 44 of the turrets with the building drum when the drums are chucked by the cones.

The swivel bearing mechanism 39 of each turret (see Figs. 6, 10) includes a post 110 to which the body 38 is secured by a clamp 111 and which post is rotatably mounted in a socket 112 in a housing 113 forming the turret base 37 on bearings 114. The lower end of the post 110 is secured to a gear 115 which when rotated, rotates the post 110 to revolve the turret head 40 as is previously described. The gear 115 is driven by a short horizontal rack 116 (see Fig. 9) disposed transversely to the base frame 35 and which is housed within the housing 113 of the turret base in mesh with the gear 115. The rack 116 is movable lengthwise to rotate the gear through the agency of a follower 118 which projects into a cam groove 119 in a stationary cam plate 120 fastened to the base frame 35 at opposite ends of the plate by screws 121 (Fig. 9). The cam groove 119 extends generally lengthwise of the base frame and includes a curved portion 123 which displaces the follower 118 of the rack transversely of the base 35 as the turret 36 is moved along the base by cylinder 50, shifting the rack 116 to cause the rotation of the gear 115. The gear 115 in turn moves the turrets swivelly and revolves the turret heads 40 during the course of the translational movement of the turrets.

The cam plate 120 of each turret is fastened at its forward end adjacent the drum to the base frame by cap screws 121 and to the outer end of the base frame by other cap screws 121. The lengthwise edges of the cam plate (see Fig. 10) are embraced by the housing 113 of the turret base and are engaged slidably by this housing along the ledges 125. The housing 113 in turn is rigidly secured to the lower plate 61 of the turret base, the plate 61 extending transversely under the cam plate 120 from one side of the housing to the other to support the housing as is shown in Fig. 10. The lower plate 61 is slidably mounted on the base frame 35 by sets of rollers 127 at each of its four corners (see Fig. 9) which roll along plane guide rails 128 at each side of the base frame. The margins of the lower plate 61 project slightly beyond the housing and are slidably locked to the base frame 35 by plates 129 (Fig. 10) which overlap these margins of the base plate. Each roller of each set 127 is mounted in a hole in the lower plate 61 with its periphery projecting slightly beyond the lower surface of the base plate to engage the plane guide rails 128. The rollers of each set 127 are jointly supported by a single pin 130 inserted through the rollers from the side edges of the base plate. Additional sets of rollers may be provided, if desired, in the upper surface of the lower plate 61 to bear against the bottom of the stationary cam plate 120 as the housing is moved. It should be noticed in Figs. 9 and 10 that the cam plate 120 is stationary and rigidly secured to the base frame 35 whereas the lower plate 61 is connected to the housing 112 to form a part of the turret base 37, and the housing 112 and lower plate 61 are jointly slidable along the cam plate which is embraced by these parts.

When the power cylinder 50 of each turret is operated to shift the turrets toward the outer portion of the frame 35 (away from the tire building drum), from the position in which the turret is shown in Fig. 9, for example, the initial movement imparted by the power cylinder 50 causes the turret heads to back axially away from the building drum. Upon further movement of the power cylinder 50 the turret is brought to a position over the curved portion 123 of the cam groove 119 which thereupon shifts the follower 118 to move rack 116 thereby swiveling the turret body 38 about the swivel bearings 39. The curved portion 123 of the cam groove 119 and the size of the rack is such that upon movement of the turret to a position beyond the curved portion 123, the turret head 40 will be directed outwardly in opposite direction from the building drum. In Fig. 9 the approximate positions of the rack 116 and the gear 115 are shown in chain dotted lines to indicate this latter position. Reverse operation of the power cylinder 50 obviously causes the turret head 40 to be revolved reversely into a position coaxial with the building drum and directed toward the building drum. Each of the turrets of the ring-placing units 25 and ring-removing units 30 includes the foregoing structure.

*Details and operation of ring latches*

The details of the latch structure for securing the extension rings 42 to the shoulders of the building drums 10, and the profile of the drum shoulders to receive the extension rings are best shown in Figs. 11 and 12. Preferably the drums are collapsible although this structure is omitted in the drawings since collapsing drum structure is well known in the art. The peripheral building surface 133 of the building drum is preferably smooth and cylindrical. At each shoulder of the drum there is a radius 134 blending the peripheral surface with a generally radial end face 135. The end face 135 in turn is blended by a fillet 136 to a generally conical surface portion 137 which terminates in a sharp corner 138 at an annular bead 139 which extends around the opening into the center of the drum. The peripheral surface 140 of the bead 139 is preferably beveled upwardly as shown in Fig. 11.

Latches 142 for securing the rings 42 to the shoulders of the drum are located interiorly of the extension rings. Preferably there are at least two such latches, and there may be any number desired provided. Each of the latches includes a latch lever 143 which is pivotally mounted to a boss 144 on the interior surface of the extension ring so that the lever extends toward the turret head 40. Adjacent the boss 144 is a lug 145 which engages the rear of the latch lever 143 close to the pivot point and which prevents the lever from swinging inward into a radial position. Additionally each of the latch levers 143 is biased away from the wall of the extension ring by a strong compression spring 146. Near the end of each lever there is a projecting lug 148 which is disposed so that it projects slightly radially inward from the peripheral rearward edge 149 of the adjacent chucking cone 44.

The latches 142 automatically engage the drum shoulders when the turret head 40 is extended toward the drum after the drum has been fully chucked and centered by the cones. This is essentially the condition shown diagrammatically in Fig. 2D and E and Figs. 11 and 12, respectively, correspond to these diagrammatic views to show the actual mechanism employed. In Fig. 11 the turret head is retracted so that the cone 44 projects through the ring 42 and in this view the complete turret is being moved translationally toward the end of the drum 10 resting on its cradle in the drum conveyor. As previously explained, the cones 44 of the opposing turrets will make the initial engagement with the drum and in particular will engage a beveled face 150 inside the bead at the end of the drum so that the further coaxial movement of the turrets raises the drum from its cradle and chucks it snugly between the cones 44. As soon as the cone 44 is fully engaged with the drum the turret head is extended by piston 81 (Fig. 6) to urge the ring coaxially over the shoulders of the drum.

Since the lug 148 of the latch lever 143 extends slightly inward behind the rearward radius edge 149 of the cone, this lug will strike this edge of the cone as the ring 42 is advanced toward the drum by the extension of the turret head, causing the lever latch 143 to be swung upwardly against spring 146 to allow the ring to clear the cone. The peripheral surface 152 of the cone 44 adjacent edge 149 is tapered upwardly and the peripheral surface 140 of the bead on the drum 10 is correspondingly tapered so that when the cones are engaged with the drum these surfaces will register as is shown in Fig. 12. Hence, the lug 148 of the latch lever, upon striking the cone, will remain in contact with and ride over these surfaces 150, 140 and is thereby swung progressively further upward toward the ring until the ring 42 has been advanced to a position in which the lug 148 is clear of the bead 139 of the drum. Thereupon, the spring 146 snaps the latch lever away from the wall of the extension ring causing the lug 148 to seat in the corner 138 of the drum shoulders adjacent the bead 139. The latch levers 143 hold the rings tightly against rotation relative to the drum at the various building stations intermediate the ring-placing unit 25 and the ring-removing unit 30 to avoid the formation of wrinkles in the portions of the plies adhered to the rings during rotation of the drums with the rings in place. The peripheral surface of the rings is, of course, cylindrical and meets flush with the peripheral surface of the drum. The lugs 145 of the rings as shown in Fig. 12 fit snugly against the radial face 135 of the building drum shoulder when the rings are secured to the drum.

*Unlatching the rings by ring-removing unit 30*

The ring-removing unit 30 as previously noted has the same structure as unit 25 except that in the turrets 36 of the ring-removing unit 30 additionally include a mechanism for disengaging the latch levers 143 from the drum shoulders. This unlatching mechanism and its mode of operation are illustrated in Figs. 14 and 15 which figures correspond to the positions of the turrets 36 shown in Figs. 2F and 2E, when the turrets are in the operation of removing a ring. The parts of the ring-removing turrets 36 common to the ring-placing turrets are identified in Figs. 14 and 15 by the same referenced numerals together with an additional letter "R" to more clearly distinguish these elements.

Fig. 14 shows a turret of the ring-removing unit 30 in the condition approaching a drum 10 resting on its supporting cradle 14 with the extension ring 42 mounted on drum shoulder. The turret head 40R is retracted so that its cone 44R can fit through the extension ring and engage the bevel face 150 of the drum to chuck the drum. After the drum is chucked, the turret head 40R is then extended toward the ring 42 so that its annulus 92R mates with the forward edge of the extension ring 42 and so that the lock mechanism 97R (see Fig. 13, not shown in Figs. 14 and 15) operate to fasten the extension ring securely to the turret head. Thereafter the lever unlatching mechanism 155 of the turret head 40R is operated to disengage the latch levers 143 of the extension rings from the shoulders of the building drum. Then the turret head 40R is retracted on the body 38R withdrawing the extension rings from the drum (see Fig. 2D), and the cone 44 is thereafter disengaged from the drum by translational movement of the turret to return the now ringless drum to the cradle for movement to the next building station for further building operations.

The mechanism 155 for unlatching the levers 143 includes a counter sleeve 156 slidable on the exterior of the support sleeve 80R of the turret head 40R and which is provided with a radial flange 157 having a comparatively thin annular member 158 secured to the periphery of and projecting forwardly from the flange portion 157 and terminating in a feather edge 159. The counter sleeve 156 is reciprocated relative to the turret head 40R along the sleeve 80R of the turret head by a piston 160 in the body 38R of the turret which piston is connected through a piston rod 161 to a spider 162 having radial arms 163 projecting through slots 164 in the body and in the sleeve member and which are secured to the counter sleeve 156. The reciprocating movement of sleeve 156 is limited in its outer position by guide rods 165 which are secured integrally to the turret head.

In operation of mechanism 155 the piston 160 is operated to urge the annular member 158 coaxially of the ring until it strikes an inwardly sloping edge 168 of the latch levers 143 and causes the levers to swing upwardly against the compression of the spring 146 toward the inner wall of the extension ring. In Fig. 15 the latch unlocking mechanism 155 is in its position in which the latch lever 143 is swung upwardly so that the lug 148 on the lever is clear of the bead 139 of the drum shoulder. In this position of the latches the turret head 40R may be retracted from the drum to withdraw the ring. Thereafter the piston 160 may be operated to return the latch mechanism to its initial position and thereby releasing the levers of the extension rings. Upon retraction of the turret heads, the turrets are moved translationally away from the drum to return the building drum to its cradle 14.

*Ring return conveyor*

The pair of ring conveyors 32 as shown in Fig. 1 extend from each of the turrets of the ring-removing unit 30 to the corresponding turrets of the ring-placing unit 25. The turrets of the ring-removing units 30 deposit extension rings on a receiving end 175 (see Fig. 16) of their respective conveyors and from which they are moved by the conveyor to a discharge end 176 adjacent the turrets of the placing unit 25 where they are in position to be picked up by the adjacent turrets of the ring-placing unit 25. The conveyor is formed with a frame structure 177 which extends generally vertically upward from the receiving end 175 and horizontally through most of its length to an inclined portion 178 which slopes downwardly at approximately 45° to the discharge end 176. The elevation of the horizontal portion of the frame structure may be arranged as desired to provide clear floor space close to the sides of the tire building machine for workmen.

The conveyor 32 is designed to roll the rings in a position in which the axis of the ring is horizontal to move the rings to the discharge end 176. Accordingly, the frame structure includes a channel 180 (see Fig. 17) formed by an outside railing 181 and an inside railing 182 which extend the full length of the conveyor and are spaced from each other a distance equal to the diameter of the extension rings. The outside railing 181 is lined with a strip of rubber material 183 against which the rings are rolled and which is secured to the railing 181. The rubber material 183 may be a strip of rubber conveyor belting. The inside railing 182 underlies a movable endless conveyor belt 185 having a load-carrying reach 187 which engages the periphery of each ring and presses it diametrically against the opposite lining material 183. The longitudinal movement of the belt reach 187 rolls the rings along the material 183 to transport the rings, the lining material 183 preventing slippage of the rings during the rolling. The belt 185 extends along the vertical and horizontal portions of the frame 177 but does not extend along the inclined portion 178 and when the rings are rolled to the inclined portion 178 they leave the belt and roll down the inclined portion by gravity toward the discharge end. Preferably the inner and outer railings of the inclined portion 178 are lined with a strip of rubber material 183. The belt 185 is driven by a drive pulley 189 mounted on the frame at the junction of the horizontal and the inclined portions through a drive unit 190. The belt is trained from the drive pulley 189 around tensioning idlers 191 to a tail pulley 192 adjacent the ring-receiving end. From the tail pulley 192 the belt is trained upwardly along the inside rail 182 of the vertical portion of the frame and over another idler 194, and then along the horizontal portion back to the drive pulley. The belt is operated so that it moves upwardly from the tail pulley 192.

At the receiving end 175 each extension ring is deposited by a ring-removing turret in an arcuate saddle 197, and after the turret has retracted from the ring, a slidable foot 198 forming the bottom portion of the saddle 197 (see Figs. 16 and 18) is elevated by a pressure cylinder 199 through a connecting rod 200 fastened to the foot 198 to raise the ring from the saddle into the portion of the channel 180 adjacent pulley 192 where the ring is engaged by the belt and the opposing side railing 181. Thereafter the belt rolls the ring upwardly along the railing 181, and then along the horizontal portion and delivers it to the inclined portion. As is shown in Fig. 18, the connecting rod 200 is guided vertically by a roller 202 mounted on the rear side of the saddle 197. To prevent a ring from tilting forwardly and falling out of the saddle 197 after the turret head is retracted, the saddle 197 includes at each side thereof a latch 205 as shown in Fig. 19. The latch includes a lever 206 pivoted on the saddle and which is biased toward the ring by a spring 207. The lever 206 includes a forward inclined face 208 which is engaged by the exterior surface of the ring when the ring is moved into the saddle 197 by a turret so that the lever is displaced by the ring and swung outwardly from the ring. As soon as the turret head is retracted, the lever 206 is snapped over the edge of the ring as shown in Fig. 19. The extension ring 42 in this view is shown in chain dotted lines.

At the discharge end 176 of the conveyor the rings are received from the inclined portion 178 of the conveyor in a curved saddle 212, which includes a rear cross bar 213 (see Figs. 16 and 20) supported at opposite ends by horizontal pins 214 projecting rearwardly from the saddle. The bar 213 is slidable on the pins 214 and is biased toward the saddle by springs 215 encircling the pins to urge a ring 42 in the saddle toward the front of the saddle. The springs 215 tend to dampen the shock of engagement of the turret heads of the ring-placing unit 25 when these heads are brought against a ring in saddle 212. The saddle 212 additionally includes at least one pivoted latch member 216 which normally hangs in the position shown in solid lines in Fig. 20 to prevent a ring 42 from falling forwardly out of the saddle 212 and the latch member 216 is arranged so that it is displaced upwardly by a turret head 40 to the dotted position of Fig. 20 when the head 40 is moved against the ring to engage it.

A group of rings 42 are shown in chain dotted lines in Fig. 16 in the positions they occupy along the incline portion while they are awaiting pickup by the ring-placing turrets. In the discharge saddle a ring is supported in coaxial alignment with the adjacent turret of the ring-placing unit. The next adjacent ring 42 is maintained at the end of the inclined portion 178 by a stop 218 operated by a pressure cylinder 219, and similarly the next several preceding rings are prevented from rolling further down the incline by similar stops 218. Near the upper end of the inclined portion a series of drag brakes 220 are mounted on the frame structure comprising L-shaped pivoted arms 221 fitted with counter weights 222. The arms 221 include a portion 223 which projects into the frame channel and drags against the rings as they roll under the arms to retard the acceleration of the rings as they roll toward the positions where they are engaged by the stops 218. As soon as a ring in saddle 212 is removed by the turrets, means such as limit switches (not shown) may be provided to operate the cylinders 219 to allow the next succeeding ring to drop into saddle 212 and to permit the remaining rings in the inclined portion 178 to advance toward the saddle 212.

*Summary of operation of the machine*

To summarize the operation of this machine, it may be seen from Fig. 1 that when a drum 10 is delivered to the first station of the machine the turrets 36 of the ring-placing unit 25 which comprises the first station are poised with a set of rings 42 to engage the shoulders of the drums. The turrets 36 immediately move axially toward the drum, chuck it, and then set the rings over the drum shoulders. The turret heads 40 then are retracted from the rings, and then the turrets are moved away from the drum to unchuck it, then they are swivelled away from the drum, moved to the discharge ends 176 of their respective ring-return conveyors 32 where they engage an additional set of rings, and then the turrets are swivelled reversely to a position in which the additional set of rings are directed toward the conveyor 11 of the machine to await the arrival of the next succeeding drum.

During movement of the turrets of the ring-removing unit to pick up a new set of rings, the drum to which the rings have been previously secured is moved to the next building station where for a tubeless tire the inner sheet of air-impervious rubber is wrapped on the drum with its margins overhanging and supported by the extension rings. The intermittent movement of this drum is continued through additional building stations until the drum reaches the ring-removing unit 30. The turrets 36 of unit 30 then move inwardly to chuck the drum, then the turret heads are extended against the rings to unlatch them from the drum heads. The turret heads are then retracted to disengage the rings, and then the turrets are backed away from the drum to unchuck it, swivelled to deposit the rings on the receiving end 175 of their respective ring return conveyors 32, and then the turrets are swivelled reversely to their neutral initial inwardly-turned position to await the arrival of the next drum. Meanwhile, the set of rings delivered to the receiving end 175 of conveyors 32 are rolled by belt 185 toward the discharge end 176 adjacent the ring-placing unit 25 so that the rings may be reset on another drum. The drum from which the rings have been removed is eventually moved by the drum conveyor through the remaining building stations where the carcass is completely finished.

The controls necessary for operating the turrets and other mechanisms in the cycles as described are mainly and preferably a series of solenoid-operated hydraulic valves (not shown) adapted to pass hydraulic fluid to the appropriate cylinders at the times needed to operate them. The timing may be effected by means of a barrel cam (not shown) the rotation of which actuates switches for energizing the various solenoid valves for the intervals desired. The timing cam action may be supplemented by various limit switches (not shown) engaged or connected with appropriate parts of the mechanism. Since this type hydraulic operating equipment will be evident to those familiar in the art in view of the foregoing description, detailed description of it is omitted.

The turrets may be advantageously utilized for other purposes than for placing extension rings. For example, they may be adapted in certain tire building machines for automatically picking an annular bead core from an appropriate supply mechanism and placing the bead core in position on the tire.

Variations in the structure disclosed may be made within the scope of the following claims.

I claim:

1. A tire-building machine comprising a series of tire-building stations, means for moving a tire-building drum in succession to said stations, means at one of said stations for fitting a generally cylindrical drum-extension ring coaxially to an end of the drum, said ring and said end of the drum having means mutually interlocking to fasten the ring coaxially to the drum so that the ring is carried by the drum from station to station, and means at another of said stations for disengaging the ring from the drum.

2. A tire-building machine comprising a series of tire-building stations; means for moving a tire-building drum in succession to said stations, ring-placing means at one of said stations for fitting a generally cylindrical drum-extension ring coaxially to an end of the drum, said ring and said end of the drum having means mutually interlocking to fasten the ring coaxially to the drum so that the ring is carried by the drum from station to station, ring-removing means at another of said stations for disengaging the ring from the drum, and means for transporting a ring disengaged from the drum from the ring-removing means to said ring-placing means.

3. In a tire-building machine having a series of tire-building stations to each of which a tire-building drum is advanced in succession, ring-placing means at one of said stations for fitting generally cylindrical drum-extension rings coaxially to the ends of the drum, and ring-removing means at another of said stations for disengaging the rings from the drum, each of said means comprising a pair of turrets for supporting the extension rings during the placing and removal thereof, and means supporting each turret for translational movement toward and away from the drum and for swivelling said turrets into and out of a position in general coaxial alignment with the drum.

4. A tire-building machine comprising a series of tire-building stations to each of which a tire-building drum is advanced in succession; means at one of said stations for fitting a pair of annular articles coaxially to the opposite shoulders of a building drum, said means including a pair of turrets and a drum-receiving portion located intermediate the turrets; and means for supporting a stock of annular articles adjacent each turret but remote from a drum in said drum-receiving portion; means for moving each said turret translationally between its respective article supporting means and a drum position in said drum-receiving portion; and means for swivelling each said turret during said translational movement into and out of a position in general coaxial alignment with the drum.

5. A tire-building machine comprising a series of tire-building stations to each of which a tire-building drum is advanced in succession; means at one of said stations for fitting a pair of annular articles coaxially against the opposite shoulders of a building drum, said means including a pair of turrets and a drum-receiving portion intermediate the turrets; means for supporting a stock of annular articles adjacent each turret but remote from a drum in said drum-receiving portion; means for engaging an article to each said turret; means for moving each said turret with an article thereon from said supporting means into a position in which the article is coaxial of the building drum; and means for transferring the article from said turret into engagement with the shoulders of the building drum.

6. A tire-building machine comprising a series of tire-building stations to each of which a tire-building drum is advanced in succession, means at one of said stations for fitting an annular article coaxially against a shoulder of a tire-building drum, said means including a turret supported for translational movement toward and away from the shoulder of the drum to which said annular article is fitted, means remote from the shoulder of the drum for supporting the article prior to its positioning on the drum, and means on the turret for engaging the article in said supporting means, and means operable by the turret for disengaging the article from the turret when the turret is moved translationally to a position adjacent the end of the drum.

7. A tire-building machine comprising a series of tire-building stations to each of which a tire-building drum is advanced in succession; ring-placing means at one of said stations for fitting a generally cylindrical drum-extension ring coaxially to the ends of a drum; ring-removing means at another of said stations for disengaging a similar ring from the ends of a drum; each said means including a pair of turrets intermediate which a drum is positioned with the ends of the drum directed toward the corresponding turret, conveyor means connecting each turret of said ring-removing means with the corresponding turret of said ring-placing means, and each of said turrets being movable translationally intermediate its respective conveyor means and end of the building drum to transport an extension ring between said drum and said conveyor means.

8. A tire-building machine in accordance with claim 7 in which said turrets include a chuck member to support said drum in cooperation with the opposing turrets, the turrets of said ring-placing means including means to engage rings to their respective drum when the drum is supported by said chuck members, and the turrets of said ring-removing means including means to disengage rings from their respective drum simultaneously with the operation of said turrets of the ring-placing means.

9. In a tire-building machine, a base frame, a drum-receiving portion intermediate the ends of the frame, a turret mounted on each end of the base frame for translational movement relative to the frame toward and away from said drum-receiving portion, means adjacent each end of the frame for supporting an annular article adapted to fit coaxially to the end shoulders of a tire-building drum in said portion, and means for moving said turrets translationally between said supporting means and said drum-receiving portion to transport an annular article to or from said supporting means from or to a drum in said drum-receiving portion.

10. In a tire-building machine, a base frame having a drum-receiving portion intermediate the ends of the frame adapted to receive a tire-building drum with the ends of the drum directed toward the ends of the frame, a turret mounted on each end of the base frame for translational movement relative to the frame toward and away from said drum-receiving portion, each turret including a chuck member engageable with an end of a drum located on said portion to support the drum in cooperation with the chuck member of the opposing turret, and a member on each turret for supporting an annular article in coaxial alignment with a drum supported by said chuck members, said member being movable relative to its respective turret toward and away from the shoulders of a drum supported between said chuck members.

11. In a tire-building machine, a base frame having a drum-receiving portion intermediate the ends of the frame adapted to receive a tire-building drum with the ends of the drum directed toward the ends of the frame, a turret mounted on each end of the base frame for translational movement relative to the frame toward and away from said drum-receiving portion, each turret including a head member for supporting an annular article engageable with a shoulder of a drum positioned at said portion, and means for swivelling each said turret relative to the base into a position in which said head member is generally coaxial of the drum during said translational movement of each turret as it approaches the drum.

12. In a tire-building machine, a base frame having a drum-receiving portion intermediate the ends of the frame adapted to receive a tire-building drum with the ends of the drum directed toward the ends of the frame; a turret mounted on each end of the base frame for translational movement relative to the frame toward and away from said drum-receiving portion; each turret including a base member movable lengthwise of said base frame, a turret body portion swivelly connected to said base member, and a head member on said body portion for supporting an annular article engageable with a shoulder of a drum positioned at said portion, means for shifting said head member axially relative to the body portion, and means for swivelling said body portion on said movable base member during said translational movement of the base member.

13. In a tire-building machine, the structure of claim 12 in combination with means interconnecting the opposing turrets to synchronize the movements of the turrets.

14. In a tire-building machine, a base frame having a drum-receiving portion intermediate the ends of the frame adapted to receive a tire-building drum with the ends of the drum directed toward the ends of the frame; a turret mounted on each end of the base frame for translational movement relative to the frame between an end of the frame and said drum-receiving portion, each turret including a base member movable lengthwise of said base frame, a turret body portion swivelly connected to said base member, a chuck member on said body portion engageable with an end of a drum located at said drum-receiving portion to support the drum in cooperation with the chuck member of the opposing turret, and a head member on said body portion for supporting an annular article concentrically around said chuck member, the head member being movable axially relative to said body portion, and means for moving said body portion swivelly relative to the base member during said translational movement of the base member.

15. In a tire-building machine, the structure of claim 14 in combination with means connected to said head member and movable relative to said body portion for disengaging an annular article from the shoulders of a tire-building drum.

16. In a tire-building machine, a base frame and a turret mounted thereon for translational movement along the base frame toward and away from an end of a tire-building drum, the turret including a base member translationally movable on the base frame, a body portion swivelly connected to said base member, and a turret head member mounted on said body portion for axial movement relative to the body portion and adapted to support an annular article engageable with an end of a tire-building drum, and means for moving said body portion swivelly relative to said base member into and out of a position in which said head member is generally coaxial with the building drum during said translational movement of the turret on the base frame.

17. In a tire-building machine, a base frame, a turret base member slidably mounted on the base frame, a turret body portion supported by said base member, the body portion including a swivel post journalled in said base member, a gear engaged with said post, a cam on said base frame, means operated by said cam to rotate said gear and thereby swivel said body portion relative to the turret base member during translational movement of said base member along said base frame, and a turret head mounted on said body portion for axial movement relative to said body portion.

18. The strucure of claim 17 which further includes means movable relative to said body portion and said turret head when the turret head is adjacent an end of a tire-building drum to disengage an annular article from the end of a tire-building drum.

19. In a tire-building drum, a first turret mechanism movable translationally toward and away from an end of a tire-building drum to engage an annular extension ring with the shoulders of said drum, a second turret mechanism movable synchronously with said first turret mechanism toward and away from an end of another tire-building drum to disengage an annular extension ring from the shoulders of the latter said drum, and a ring-return conveyor extending from said second turret mechanism to said first turret mechanism at a position remote from said drums, said second turret mechanism being swivelly mounted relative to its respective drum to deliver a disengaged ring to said conveyor, and said first turret mechanism being swivelly mounted relative to its respective drum to receive an extension ring from said conveyor.

20. The structure of claim 19 in which said ring-return conveyor includes a railing member along which the peripheral surface of an extension ring is adapted to roll, and a travelling belt for pressing said rings against said railing member and rolling said rings toward said first turret mechanism.

21. In a tire-building machine equipped with mechanism for engaging and disengaging annular extension rings with a tire-building drum, a conveyor for transferring rings from a ring-removal location in the machine to a ring-placing location in the machine, the conveyor comprising at one end thereof a ring-receiving member engageable with the periphery of the ring at the ring-removal location in the machine, at the other end of the conveyor a ring-supporting member engageable with the periphery of the ring at the ring-placing location in the machine, a railing leading from said ring-supporting member toward said ring-supporting member, and a belt spaced laterally from said railing and operable to engage the peripheral surface of a ring with said railing and roll the ring with its peripheral surface on the railing toward said ring-supporting member.

22. A structure in accordance with claim 21 in which said ring-receiving member includes means to transfer a ring from said member into engagement with said belt and railing.

23. A structure in accordance with claim 21 which includes means to admit extension rings in succession to said ring-supporting means.

24. A tire-building drum having a cylindrical peripheral building surface and a projecting shoulder portion offset radially inward from said building surface, a bead on said shoulder projecting radially outward from said shoulder portion and having an outer surface inclined to the axis of the drum and upwardly from the end of the drum toward said peripheral building surface, said outer bead surface being adapted to displace a latch on a drum extension ring assembled with said shoulder and said bead engaging the latch of an extension ring to lock the extension ring to the drum shoulder.

25. An extension ring for a tire-building drum, the ring comprising a cylindrical shell adapted for coaxial engagement with an end of a tire-building drum with one edge of the shell abutting a shoulder region of the tire-building drum, a shoulder-engaging latch on the interior peripheral surface of said shell, said latch comprising a lever pivotally connected to the shell adjacent said drum-abutting edge thereof and extending axially through the shell away from said edge, a spring normally biasing said lever away from said shell, means engaged with the lever to maintain said lever in pressure engagement with said spring, a lug projecting from said lever adapted to contact a bead on the shoulder of the tire-building drum with which said ring is assembled to displace said lever pivotally against said spring and to engage the bead of the drum to lock the ring to said shoulder.

26. An extension ring for a tire-building drum, the ring comprising a cylindrical shell adapted for coaxial engagement with an end of a tire-building drum with one edge of the shell abutting a shoulder region of the tire-building drum, a shoulder-engaging latch on the interior peripheral surface of said shell, said latch comprising a lever pivotally connected to the shell adjacent said drum-abutting edge thereof and extending axially through the shell away from said edge, said lever being adapted to interlock with a bead on the shoulder of the tire-building drum with which said ring is assembled, a spring normally biasing said lever away from said shell and maintaining said lever in locking engagement with the bead of the drum, and a surface portion on said lever engageable by an appropriate tool to displace said lever pivotally against said spring to disengage the extension ring from the tire-building drum.

27. An assembly comprising a tire-building drum in accordance with claim 24 and an extension ring in accordance with claim 25.

28. An assembly comprising a tire-building drum having a cylindrical peripheral building surface and a projecting shoulder portion offset radially inward from said building surface, a cylindrical extension ring embracing and engaged with said shoulder portion and coaxial with said building surface of the drum, a latch mechanism interiorly of said extension ring including a pivoted lever spring biased toward said shoulder, means on said drum shoulder engaged by said lever to lock the extension ring to said drum shoulder, and said lever including a surface portion engageable with an appropriate tool to displace said lever pivotally to disengage the extension ring from the tire-building drum.

29. In a tire-building machine having a series of tire-building stations to each of which a tire-building drum is advanced in succession, means at one of said stations for fitting a generally cylindrical drum-extension ring coaxially to an end of the drum, and means at another of said stations for disengaging the ring from the drum, each of said means comprising a turret for supporting the extension rings during the placing and removal thereof, and means supporting each turret for translational movement toward and away from the drum and for swivelling said turrets into and out of a position in general coaxial alignment with drum.

30. In a tire-building machine, a base frame, means for mounting a tire-building drum thereon, a turret mounted on the base frame for translational movement relative to the frame toward and away from one end of a drum on said mounting means, means remote from the drum for supporting an annular article adapted to be fitted coaxially to the end shoulders of the drum, means on said turret for removing the annular article from its supporting means, and means for moving said turret translationally from said article-supporting means to a position of coaxial alignment with said drum to transfer the annular article into coaxial engagement with the end of the drum.

References Cited in the file of this patent

UNITED STATES PATENTS

| | | |
|---|---|---|
| 2,441,791 | Bostwick | May 18, 1948 |
| 2,479,027 | Sternad et al. | Aug. 16, 1949 |
| 2,487,196 | Sternad et al. | Nov. 8, 1949 |
| 2,517,889 | Kuffler | Aug. 8, 1950 |
| 2,558,903 | Kastner | July 3, 1951 |
| 2,565,071 | Frazier | Aug. 21, 1951 |